(12) United States Patent
Gao et al.

(10) Patent No.: US 10,305,921 B2
(45) Date of Patent: May 28, 2019

(54) NETWORK SECURITY APPARATUS AND METHOD OF DETECTING MALICIOUS BEHAVIOR IN COMPUTER NETWORKS VIA COST-SENSITIVE AND CONNECTIVITY CONSTRAINED CLASSIFICATION

(71) Applicant: INTERNATIONAL BUSINESS MACHINES CORPORATION, Armonk, NY (US)

(72) Inventors: Jing Gao, Buffalo, NY (US); Deepak Turaga, Yorktown Heights, NY (US); Long H. Vu, Yorktown Heights, NY (US); Houping Xiao, Buffalo, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 15/141,127

(22) Filed: Apr. 28, 2016

(65) Prior Publication Data

US 2017/0353480 A1 Dec. 7, 2017

(51) Int. Cl.
*H04L 29/06* (2006.01)
*G06F 21/55* (2013.01)
(Continued)

(52) U.S. Cl.
CPC ........ *H04L 63/1425* (2013.01); *G06F 21/552* (2013.01); *G06F 21/577* (2013.01);
(Continued)

(58) Field of Classification Search
CPC ............. H04L 63/1425; H04L 63/0227; H04L 63/1466; H04L 63/1433; H04L 43/12;
(Continued)

(56) References Cited

U.S. PATENT DOCUMENTS 7,120,931 B1 * 10/2006 Cheriton ............. H04L 63/0227
726/13
8,341,745 B1 * 12/2012 Chau ...................... G06F 21/56
709/223

(Continued)

OTHER PUBLICATIONS

Manadhata et al. "Detecting Malicious Domains via Graph Inference" Nov. 7, 2014, pp. 1-18, Hewlett Packard Laboratories.*

*Primary Examiner* — Robert B Leung
*Assistant Examiner* — Thomas Ho
(74) *Attorney, Agent, or Firm* — F. Chau & Associates, LLC

(57) ABSTRACT

A network security apparatus includes a packet detector detecting transmission of data packets between a plurality of hosts and a plurality of domains and defining a plurality of links therefrom. A model builder circuit receives the plurality of links from the packet detector, receives ground truth information labeling one or more of the plurality of hosts or one or more of the plurality of domains as benign or malicious, generates predictive models from the received links and ground truth information, and stores generated predictive models in a predictive model database. An anomaly detector circuit retrieves the generated predictive models from the predictive model database and uses the predictive models to label each of the plurality of hosts and plurality of domains, that have not previously been labeled by the ground truth information, as benign or malicious.

14 Claims, 5 Drawing Sheets

(51) Int. Cl.
  *G06F 21/57* (2013.01)
  *G06N 99/00* (2019.01)
  *H04L 12/26* (2006.01)

(52) U.S. Cl.
  CPC ......... *G06N 99/00* (2013.01); *H04L 63/0227* (2013.01); *H04L 63/1466* (2013.01); *H04L 43/062* (2013.01); *H04L 43/12* (2013.01); *H04L 63/1433* (2013.01)

(58) Field of Classification Search
  CPC ... H04L 43/062; G06F 21/566; G06F 21/552; G06F 21/577
  See application file for complete search history.

(56) References Cited

U.S. PATENT DOCUMENTS

| | | | | |
|---|---|---|---|---|
| 8,402,543 | B1* | 3/2013 | Ranjan | H04L 63/1416 709/223 |
| 8,443,441 | B2* | 5/2013 | Stolfo | H04L 51/12 709/206 |
| 8,578,497 | B2* | 11/2013 | Antonakakis | G06F 21/577 709/224 |
| 8,762,298 | B1* | 6/2014 | Ranjan | G06N 5/02 706/12 |
| 2011/0231246 | A1 | 9/2011 | Bhatia et al. | |
| 2014/0310808 | A1* | 10/2014 | Yao | G06F 21/316 726/22 |
| 2015/0039390 | A1 | 2/2015 | Hu et al. | |
| 2015/0134304 | A1 | 5/2015 | Guiver et al. | |
| 2015/0195299 | A1* | 7/2015 | Zoldi | H04L 63/1433 726/25 |

* cited by examiner

NETWORK SECURITY APPARATUS AND METHOD OF DETECTING MALICIOUS BEHAVIOR IN COMPUTER NETWORKS VIA COST-SENSITIVE AND CONNECTIVITY CONSTRAINED CLASSIFICATION

GOVERNMENT LICENSE RIGHTS STATEMENT

This invention was made with Government support under Contract No.: H98230-14-D-0038 awarded by the Department of Defense. The Government has certain rights in this invention.

BACKGROUND

1. Technical Field

The present disclosure relates to a network security apparatus and, more specifically, to a method for detecting malicious behavior in computer networks via cost-sensitive and connectivity constrained classifications, and a network security apparatus making use of the same.

2. Discussion of Related Art

Every day, a large number of malicious attacks result in causing costly damage to large-scale computer networks. Accordingly, cybersecurity has been brought to the attention of researchers, enterprises, and government. One of the ways in which cybersecurity experts have been able to mitigate the damage associated with malicious attacks is by monitoring computer network data to determine when the security of one or more devices on the network has been compromised. For example, enterprises may analyze the flow of network traffic at core routers, Domain Name System (DNS) traffic at DNS servers, HyperText Transfer Protocol (HTTP) traffic through gateways or firewalls, Dynamic Host Configuration Protocol (DHCP) traffic at the DHCP server, and so on. However, due to the limited amount of ground truth and the issue of imbalanced label distributions, it is challenging to automatically detect malicious behavior and abnormal network activity.

BRIEF SUMMARY

A network security apparatus includes a packet detector detecting transmission of data packets between a plurality of hosts and a plurality of domains and defining a plurality of links therefrom. A model builder circuit receives the plurality of links from the packet detector, receives ground truth information labeling one or more of the plurality of hosts or one or more of the plurality of domains as benign or malicious, generates predictive models from the received links and ground truth information, and stores generated predictive models in a predictive model database. An anomaly detector circuit retrieves the generated predictive models from the predictive model database and uses the predictive models to label each of the plurality of hosts and plurality of domains, that have not previously been labeled by the ground truth information, as benign or malicious.

The network security apparatus may be a packet router. The network security apparatus may be a firewall. The predictive model may be generated, by the model builder circuit, by constructing a bipartite graph in which each of the plurality of hosts are represented as nodes on one side of the graph, each of the plurality of domains are represented as nodes on an opposite side of the graph, and each of the plurality of links are represented as edges connecting nodes on opposite sides of the graph.

An edge weight of each of the edges may be determined by either a number of links between a given host and a given domain or an amount of data transferred between the given host and the given domain. The predictive model may be generated, by the model builder circuit, by extracting features from each of the nodes of the graph and determining which of the extracted features are highly correlated to positive labels. A node that is linked to a node with a positive label may have an increased probability of being positively labeled.

The packet detector may be a router that forwards packets between the plurality of hoists and the plurality of domains. When the anomaly detector circuit labels one of the plurality of hosts or plurality of domains, that have not previously been labeled by the ground truth information, as malicious, the router may block traffic to and from the malicious-labeled host or domain.

A method for detecting malicious behavior in a computer network includes receiving packet transmission information including a plurality of data links between a plurality of hosts and a plurality of domains. A bipartite graph is constructed in which each of the plurality of hosts are represented as nodes on one side of the graph, each of the plurality of domains are represented as nodes on an opposite side of the graph, and each of the plurality of links are represented as edges connecting nodes on opposite sides of the graph. One or more of the nodes of the bipartite graph are labeled as benign or malicious according to ground truth information. A cost matrix is defined for misclassification penalty in which a misclassification penalty for labeling a benign node as malicious is less than a misclassification penalty for labeling a malicious node as benign. Supervised models or classifiers are constructed based on the nodes of the bipartite graph labeled according to ground truth information, the plurality of links, and the designed cost matrix. Each of the plurality of hosts and each of the plurality of domains, that have not previously been labeled by the ground truth information, are labeled as benign or malicious according to the constructed supervised models or classifiers.

At least a first of the constructed supervised models or classifiers may be responsible for labeling nodes and at least a second of the constructed supervised models or classifiers may be responsible for labeling domains.

An edge weight of each of the edges may be determined by either a number of links between a given host and a given domain or an amount of data transferred between the given host and the given domain.

The supervised models or classifiers may be constructed by extracting features from each of the nodes of the graph and determining which of the extracted features are highly correlated to malicious labels.

When one of the plurality of hosts or plurality of domains, that have not previously been labeled by the ground truth information, is labeled as malicious, according to the constructed supervised models or classifiers, an alert may be transmitted to a network administrator.

When one of the plurality of hosts or plurality of domains, that have not previously been labeled by the ground truth information, is labeled as malicious, according to the constructed supervised models or classifiers, traffic to and from the malicious-labeled host or domain may be blocked.

A method for detecting malicious behavior in a computer network includes receiving packet transmission information including a plurality of data links between a plurality of hosts and a plurality of domains. A bipartite graph is constructed in which each of the plurality of hosts are represented as nodes on one side of the graph, each of the plurality of domains are represented as nodes on an opposite side of the graph, and each of the plurality of links are represented as edges connecting nodes on opposite sides of the graph. One or more of the nodes of the bipartite graph are labeled as benign or malicious according to ground truth information. The labeling of the one or more nodes of the bipartite graph that have been labeled as benign or malicious are propagated along the plurality of links.

Propagating the labeling of the one or more nodes of the bipartite graph that have been labeled as benign or malicious along the plurality of links may include constructing supervised models or classifiers based on the nodes of the bipartite graph labeled according to ground truth information and the plurality of links. A node that is linked to a node with a positive label may have an increased probability of being positively labeled.

Constructing supervised models or classifiers may further include designing a cost matrix for misclassification penalty in which a misclassification penalty for labeling a benign node as malicious is less than a misclassification penalty for labeling a malicious node as benign.

The supervised models or classifiers may be constructed by extracting features from each of the nodes of the graph and determining which of the extracted features are highly correlated to malicious labels. When a malicious label is propagated, an alert may be generated.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
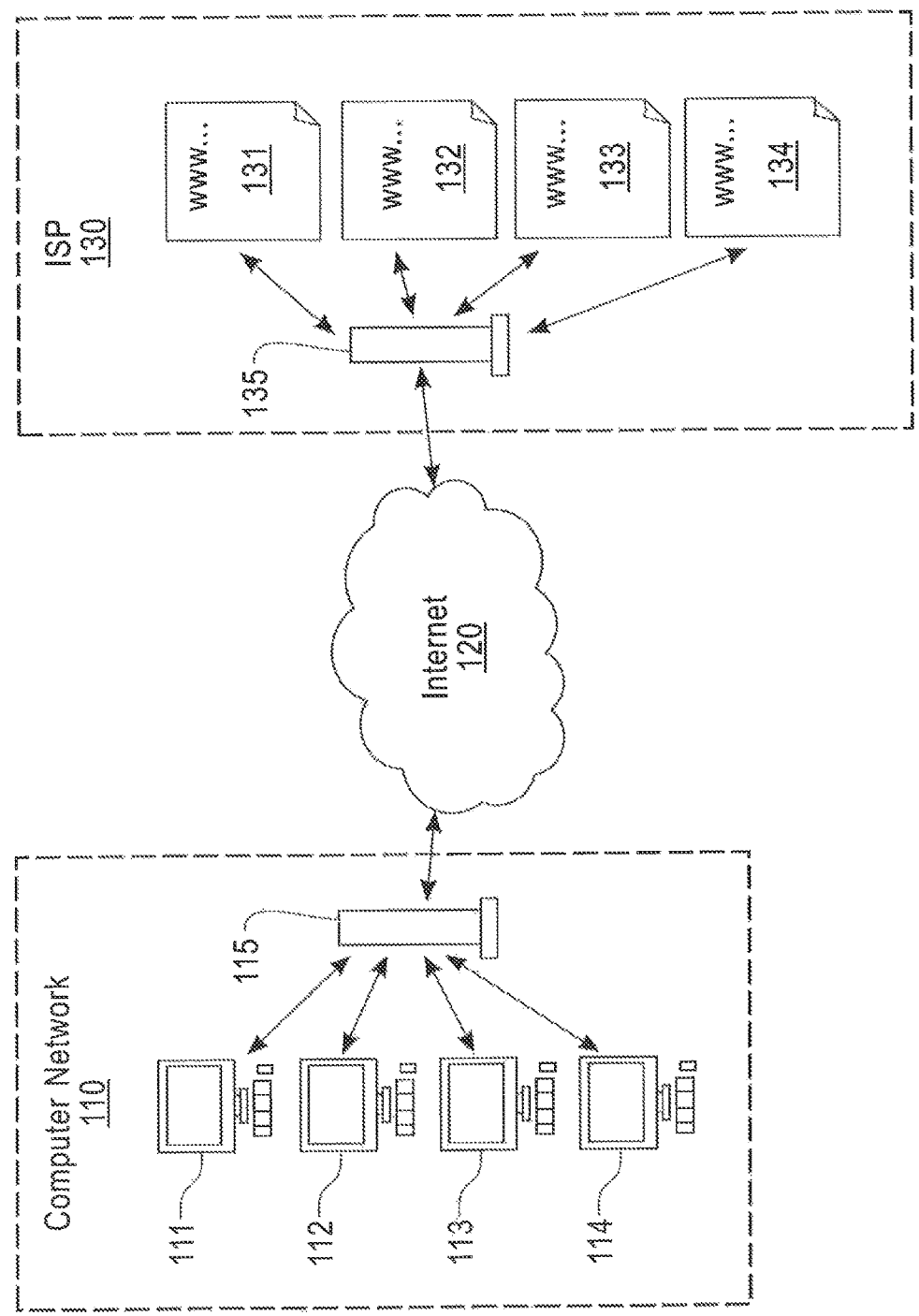
FIG. 1 is a schematic diagram illustrating an apparatus for performing network anomaly detection in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to mitigate damage associated with malicious attack by analyzing network traffic to identify relationships between hosts, which may be computerized devices connected to a computer network, such as desktop computers, laptop computers, mobile devices, and other connected devices, and domains, which may be content that is hosted and made available over the computer network at a particular address (e.g. URL), such as websites, web services, and the like.

Cybersecurity may be provided by accurately determining whether each host and each domain is malicious or benign (i.e., negative or positive labels). To do this, classifiers may be trained, or classification algorithms designed, to label hosts and domains. Traditionally, separate classifiers have been used to label hosts and domains. For example, host classifiers are trained based on malicious and benign host data while domain classifiers are trained based on malicious and benign domain data.

However, the performance of these separately trained classifiers may not be good when ground truth is limited. For example, when there is insufficient training data available to show what all forms of malicious hosts/domains may look like. To overcome this challenge, exemplary embodiments of the present invention consider the relationships between the hosts and domains. Exemplary embodiments of the present invention exploit the understanding that hosts which visit malicious URLs more frequently are more likely to be malicious, and URLs that are visited more frequently by malicious hosts are more likely to be malicious. Accordingly, exemplary embodiments of the present invention provide approaches that analyze links (e.g. the passing of data between the hosts and domains) to more accurately label both hosts and domains.

Moreover, the issue of imbalanced label distributions is commonly observed in real computer networks, where there are far fewer malicious hosts/domains (i.e., positive labels) than benign ones (i.e., negative labels). Often, in training classifiers for the labeling of either hosts or domains, an equal cost is used for both false positives (labeling a benign host/domain as malicious) and false negatives (labeling a malicious host/domain as benign). As a result, conventionally trained classifiers may tend to label a very high number of objects as negative/benign to achieve high accuracy, as most objects are likely to be negative/benign. However, as the results caused by false negative is more serious as compared to that of false positive, exemplary embodiments of the present invention incorporate distinct misclassification costs for false positive and false negative in the classification model. The misclassification costs, in accordance with exemplary embodiments of the present invention, may be formulated as an optimization problem in which the goal is to find an optimal model that minimizes the total cost, for example, defined as the misclassification costs multiplied by the misclassification errors which may be measured by the Hamming distance between the predicted and true labels over all available samples.

Accordingly, exemplary embodiments of the present invention train cost-sensitive models for labeling hosts and domains, by considering the links between the hosts and domains. For example, a bipartite connectivity graph consisting of network hosts and external domains may be used. A small set of domains' labels (limited ground truth) may then be used to propagate labels across hosts and domains via their links. During the propagation, exemplary embodiments of the present invention may consider behavioral features of the hosts computed from the network data as well as lexical and reputational features computed for the external domains. The predicted labels may be modeled, the misclassification errors may be measured by the Hamming distance between the predicted and true labels, different costs may be incorporated for different misclassification types (i.e., false negative or false positive), and constrain connected nodes may have the same labels in high probability. An optimization task is then formulated. As the Hamming distance function is non-differentiable, exemplary embodiments of the present invention may introduce a continuous loss function to approximate the Hamming distance with performance guaranteed. An effective algorithm with good convergence property may be provided via Stochastic Gradient Descent technique.

Accordingly, exemplary embodiments of the present invention utilize a framework that may be referred to herein as, "Connectivity Constrained Logistic Regression" (CCLR) to incorporate the links between hosts and domains to detect malicious behavior in computer networks and to overcome challenges associated with limited ground truths. The CCLR may be formulated as an optimization problem, incorporating different costs for false positive and false negative misclassification errors. A continuous loss function may be used to approximate the Hamming distance function that is nondifferentiable, and to develop the corresponding solution via Stochastic Gradient Descent technique. Furthermore, the convergence may be analyzed.

FIG. 1 is a schematic diagram illustrating an apparatus for performing network anomaly detection in accordance with exemplary embodiments of the present invention. Network anomaly detection, in accordance with exemplary embodiments of the present invention, may be performed either with respect to a computer network 110 that includes a plurality of computer hosts 111, 112, 113, and 114 or may be performed with respect to an internet service provider (ISP) 130 that includes one or more domains 131, 132, 133, and 134. The apparatus may be embodied as a network router, a firewall device, or a packet sniffing device. For example, the apparatus may be embodied as a router 115 disposed within the computer network 110 or a firewall device 135 disposed by the ISP 130 for the protection of the one or more domains 131-134.

In either event, a network device 115 such as a router, disposed within the computer network 110 may be responsible for routing or analyzing data packets that enter and leave the computer network 110 via the Internet 120. The network device may keep track of data transactions between the hosts 111-114 of the computer network 110 and various domains, such as the domains 131-134 of the ISP 130 by either analyzing the packets that pass therethrough, or as part of its ordinary function as networking hardware. However, from the point of view of maintaining the cybersecurity of the computer network 110, it need not matter that the domains in communication with the hosts are part of the same ISP.

In this way, the network apparatus 115 may keep track of links between its hosts 111-114 and various domains such as domains 131-134 to assure the cybersecurity of the computer network 110. Similarly, the network apparatus 135 that is disposed by the ISP 130 may assure the cybersecurity of its domains 131-134 by examining packets that pass therethrough to make a note of links between its domains 131-134 and the various hosts that are in contact therewith. However, from the point of view of maintaining the cybersecurity of the ISP 130, it need not matter that the hosts in communication with the domains are part of the same computer network.

In this way, the network apparatuses 115 and 135 may be in a position to monitor all host/domain links, for example, to count a number of links, to count a number of packets, and/or to count an amount of data that is communicated across the various links.

Figure 2:
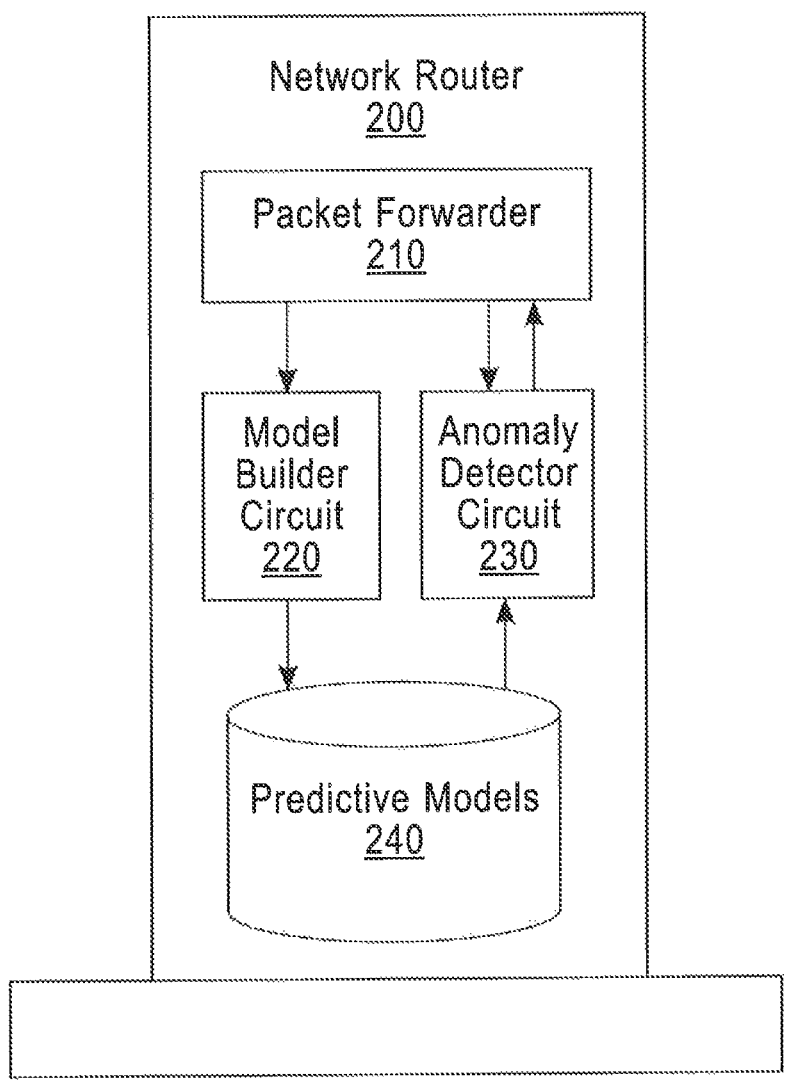
FIG. 2 is a schematic view of a network apparatus, such as a network router, in accordance with exemplary embodiments of the present invention.

FIG. 2 is a schematic view of a network apparatus, such as a network router, in accordance with exemplary embodiments of the present invention. The network apparatus/router 200 may include a packet forwarding/routing device 210, which may be analogous to a conventional network router, as it is responsible for receiving packets from within the computer network and routing them to the linked domains and receiving packets from the linked domains and routing them to the to the hosts within the computer network. The network apparatus/router 200 may also make a record of the various links and pass this link record to a model builder/trainer circuit 220. The model builder/trainer circuit 220 may receive the link record, and various ground truths from an external source, and may use this data to generate predictive models for labeling hosts and domains as positive/negative. The predictive models, which may include one or more models for labeling hosts and one or more models for labeling domains, may be stored in a predictive model database 240.

An anomaly detector circuit 230 may then use the stored predictive models of the predictive model database 240 to label each of the hosts and domains and to generate an alert when a host or domain has been labeled as positive/malicious. According to one exemplary embodiment of the present invention, when a host or domain has been labeled positive/malicious, the anomaly detector circuit 230 may instruct the packet forwarder 210 to stop routing packets to and from the positive-labeled host/domain. This remedial action may, however, be reserved for cases in which a confidence level associated with the positive labeling exceeds a predetermined threshold.

It is to be understood, however, that the model builder 220 may be external to the network apparatus/router 200 and the network apparatus/router 200 may receive the predictive models from an external source and then store the so-received predictive models in the predictive model database 240 for use by the anomaly detector circuit 230.

Figure 3:
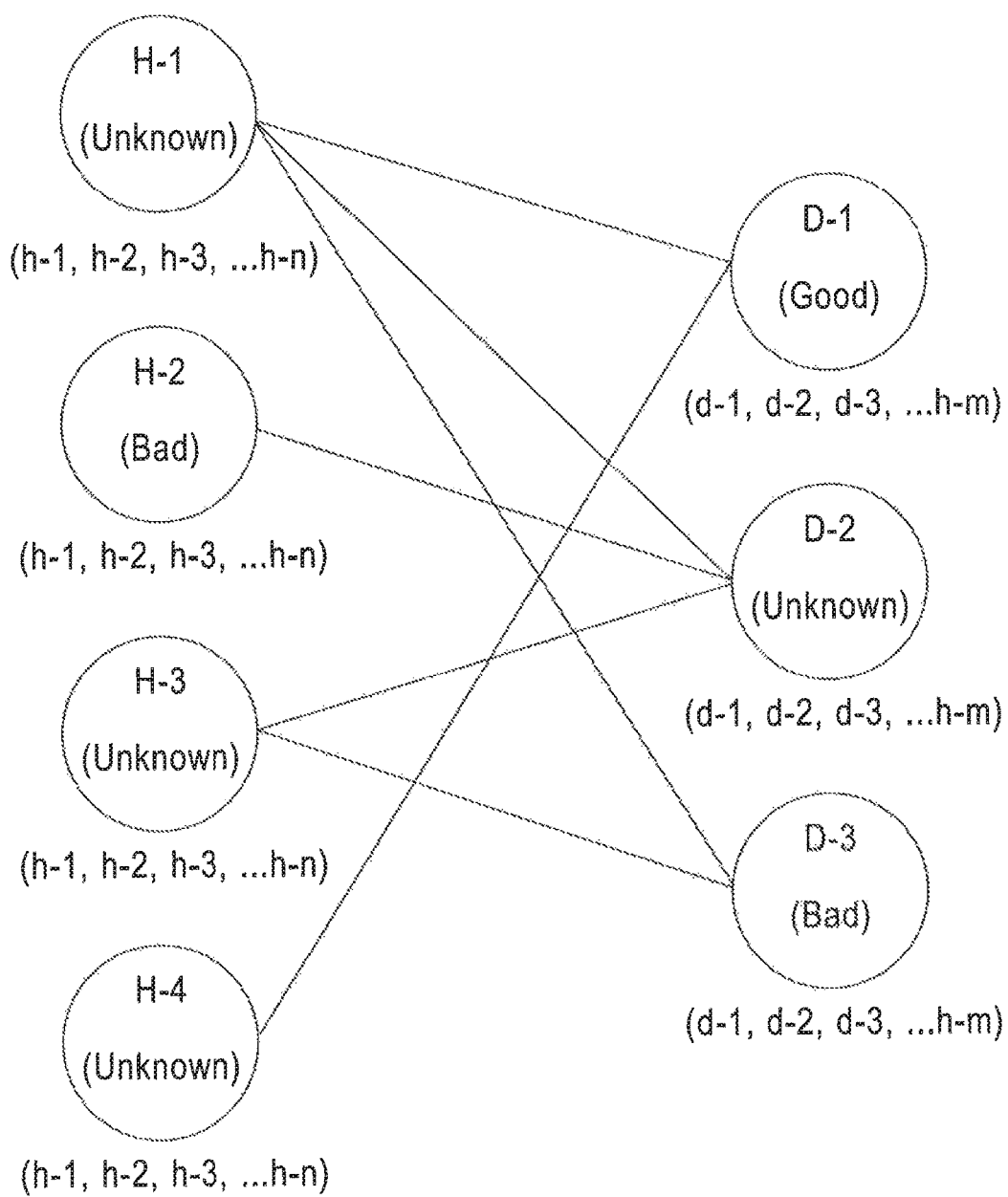
FIG. 3 is an exemplary, simplified bipartite graph representing a bipartite graph that may be used to perform anomaly detection in accordance with exemplary embodiments of the present invention.

As described above, exemplary embodiments of the present invention may perform anomaly detection by constructing a bipartite graph in which nodes represent hosts on one side and domains on the other, and edges connecting the host nodes with the domain nodes represent links, which may be defined as the communication of data between domain and host. FIG. 3 is an exemplary, simplified bipartite graph representing a bipartite graph that may be used to perform anomaly detection in accordance with exemplary embodiments of the present invention.

As can be seen from the bipartite graph of FIG. 3, there are four nodes representing four hosts on the left side of the graph: H-1, H-2, H-3, and H-4. There are also three nodes representing three domains in the right side of the graph: D-1, D-2, and D-3. If used from the perspective of a host computer network, all four of the hosts may be within a single network while the domains may be of various ISPs. However, if used from the perspective of an ISP, all three of the domains may be of a single ISP while the hosts may be of various computer networks.

Some limited ground truth may be available, and here, that ground truth data indicates host H-2 is positive/malicious ("bad") and that domain D-1 is negative/benign ("good"), but no additional ground truth information might be available. In training the classifiers/predictive models, various features may be determined or received for each node (including both hosts and domains). For example, n host features may include: h-1, h-2, h-3, . . . , h-n and m domain features may include d-1, d-2, d-3, . . . , d-m.

The edges that connect hosts with domains may be weighted, for example, edge weight may represent number of links, frequency of links, amount of data exchanged, etc. As will be described in detail below, a cost matrix may be designed for misclassifications in which under-inclusion (false negative) is penalized more greatly than over-inclusion (false positive). Then, features may be extracted, using the graph, and supervised models/classifiers may be built.

Figure 4:
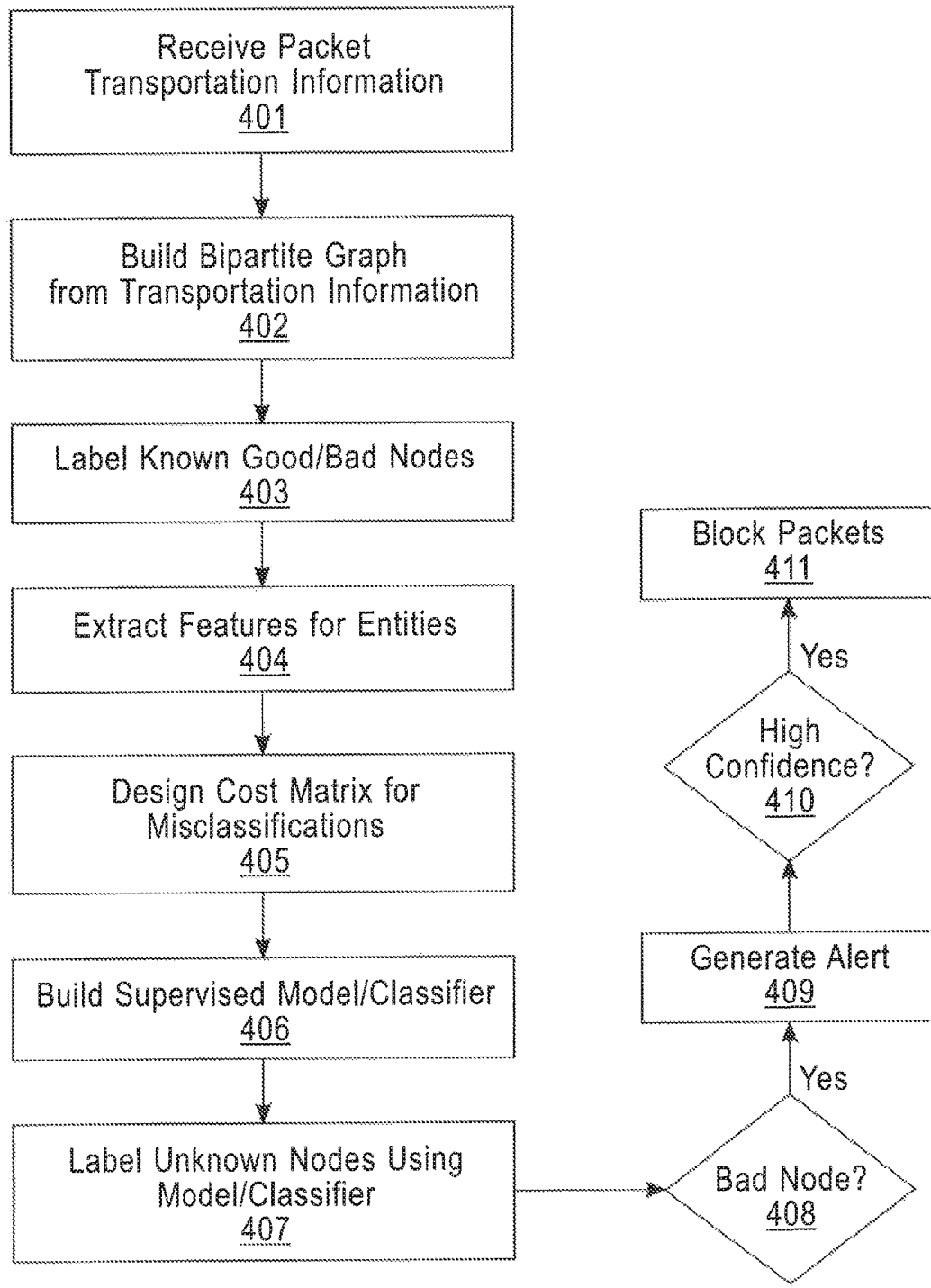
FIG. 4 is a flow chart illustrating an approach for detecting malicious behavior in computer networks in accordance with exemplary embodiments of the present invention.

FIG. 4 is a flow chart illustrating an approach for detecting malicious behavior in computer networks in accordance with exemplary embodiments of the present invention. First, link information may be received (Step 401). As discussed above, link information may be information pertaining to the connections made between hosts and domains. This information may be captured, for example, during packet routing or by packet inspection. Next, a bipartite graph may be constructed from the link information (Step 402). As discussed above, in the bipartite graph, hosts and domains are represented by nodes and the links (e.g. data exchanges/connections between hosts and domains) are represented by edges on the graph, where edge weight may be indicative of a level of data transfer or a number of discrete data transfer occasions.

The nodes may then be labeled in accordance with available ground truth data (Step 403). As discussed above, the availability of ground truth data may be limited. The ground truth data may include an indication as to which nodes are known good (i.e. negative) and which nodes are known bad (i.e. positive). In light of the limited availability of this ground truth data, it is to be understood that most nodes may remain unlabeled.

Features may then be extracted from the nodes (Step 404). Consider H hosts and D domains, for hosts, there may be m features (h-1, h-2, ... h-m), including, for example, the number of bytes, flows, ad packets of traffic, etc. For domains, there may be n features (d-1, d-2, ..., d-n) extracted, including, for example, lexical features of full URLs, text feature of page content, etc. Assuming that each host is visited by at least one domain and that each domain is visited by at least one host, the label for the i-th host may be denoted as $y_i^h$, $i \in [H]$ where [H] is defined as the set of $\{1, 2, \ldots, H\}$.

If host i is benign, $y_i^h=1$, otherwise $y_i^h-1$. Similarly, the j-th domain may be labeled as $y_j^d$, $j \in [D]$ where [D] is defined as the set of $\{1, 2, \ldots, D\}$. The links between hosts and domains may be represented by a matrix $M \in \mathbb{R}^{H \times D}$ Each entry in M may be defined as follows: $M_{ij}=1$ if the i-th host visits domain j. Otherwise, $M_{ij}=0$.

Given a small set of labels for $l^h$ hosts and $l^d$ domains, the features of hosts and domains, as well as the links M, the goal is to automatically learn the labels for the remaining unlabeled hosts and domains. This may be accomplished in steps 405-407, for example, as described below.

Based on the idea of logistic regression classifier, the conditional probabilities of two classes (benign/malicious) may be modeled via a linear function on the features. The feature vectors for hosts and domains may be denoted as h=(1, h-1, ..., h-m) and d=(1, d-1, ..., d-n), respectively.

The formulation on the hosts is described in detail below. The formation on the domains may be similarly obtained.

Given the feature vector h-i of the i-th host, its conditional probability being benign has the following form:

$$\mathbb{P}[y_i^h = 1 \mid h_i] = \frac{e^{\alpha \cdot h_i}}{1 + e^{\alpha \cdot h_i}}; \qquad [1]$$

where α is a model parameter for hosts. Here $\mathbb{P}[y_i^h=-1|h_i]$ i.e., $1-\mathbb{P}[y_i^h=1|h_i]$)nds for the probability of host i being malicious. Similarly, the probability for the j-th domain with feature vector $d_j$ being benign is that $$\mathbb{P}[y_j^d = 1 \mid d_j] = \frac{e^{\beta \cdot d_j}}{1 + e^{\beta \cdot d_j}},$$

here β is model parameter for domains. $\mathbb{P}[y_j^d=-1|d_j]$ (i.e. $1-\mathbb{P}[y_j^d=1|d_j]$) ie probability of the j-th domain being malicious.

Accordingly, the node may be labeled as benign if the conditional probability for a host/domain to be benign is larger than that of being malicious; otherwise it is malicious. Mathematically, the predictive label may be denoted as $\hat{y}_i^h$ and $\hat{y}_j^d$ for the i-th and j-th domain, separately. For example, the predictive label $\hat{y}_i^h$ for the i-th host associated with feature $h_i$ may be defined as:

$$\hat{y}_i^h = \begin{cases} 1 & \text{if } \mathbb{P}[y_i^h = 1 \mid h_i] \geq \mathbb{P}[y_i^h = -1 \mid h_i]; \\ -1 & \text{otherwise} \end{cases}.$$

Plugging in equation [1], $\forall i \in [H]$, results in:

$$\hat{y}_i^h = \text{sgn}(\mathbb{P}[y_i^h = 1 \mid h_i] - \mathbb{P}[y_i^h = -1 \mid h_i]) \Leftrightarrow \hat{y}_i^h =$$

$$\text{sgn}\left(\frac{e^{\alpha \cdot h_i} - 1}{e^{\alpha \cdot h_i} + 1}\right) \Leftrightarrow \hat{y}_i^h = \text{sgn}(e^{\alpha \cdot h_i} - 1) \Leftrightarrow \hat{y}_i^h = \text{sgn}(\alpha \cdot h_i).$$

Here, sgn(•) is sign function and for a real-valued function $f: X \to \mathbb{R}$ its sign function is defined as sgn (f(x))=1 if $f(x) \geq 0$; sgn (f(x))=-1 otherwise.

Moreover, $\hat{y}_j^d = \text{sgn}(\beta \cdot d_j)$, $\forall j \in [D]$. Accordingly, the problem of labeling the nodes may be formulated as solving the following optimization problem:

$$\min_{\alpha,\beta}\left\{\frac{1}{l^h}\left[\sum_{i=1}^{l^h} L(y_i^h, \hat{y}_i^h) + \sum_{j=1}^{l^d} L(y_j^d, \hat{y}_j^d)\right]\right\} \qquad [2]$$

where L(•,•) is a loss function. The underlying principal may be described in terms of the optimal model parameters, α* and β* minimizing total misclassification errors between the predicted and true labels over all available samples.

However, as described above, the optimization problem may treat the penalty of all kinds of misclassification types equally, which may be inadequate for the imbalanced class distribution that is most likely to occur (e.g. there will probably be far more negatives than positives). To overcome this challenge, exemplary embodiments of the present invention design a cost matrix for misclassification error (Step 405) in which there is a different cost associated with misclassifying a positive node as negative than misclassifying a negative node as positive. Table 1 below is an example of such a cost matrix:

TABLE 1

Exemplary Cost Matrix

|  | True Label +1 | True Label −1 |
|---|---|---|
| Predicted Label +1 | 0 | c |
| Predicted Label −1 | a | 0 |

Here, c>α, which is to say, there is a greater penalty for false positive than for false negative. Incorporating this cost matrix into equation [2] yields:

$$\min_{\alpha,\beta} \frac{1}{l^h} \sum_{i=1}^{l^h} [aL(y_i^h, \hat{y}_i^h)]^{\frac{1}{2}(1+y_i^h)} [cL(y_i^h, \hat{y}_i^h)]^{\frac{1}{2}(1-y_i^h)} + \quad [3]$$

$$\frac{1}{l^d} \sum_{j=1}^{l^d} [aL(y_j^d, \hat{y}_j^d)]^{\frac{1}{2}(1+y_j^d)} [cL(y_j^d, \hat{y}_j^d)]^{\frac{1}{2}(1-y_j^d)}.$$

Equation [3] may then be expressed as the following optimization problem:

$$\min_{\alpha,\beta} \frac{1}{l^h} \sum_{i=1}^{l^h} \left(\frac{a}{c}\right)^{\frac{y_i^h}{2}} L(y_i^h, \hat{y}_i^h) + \frac{1}{l^d} \sum_{j=1}^{l^d} \left(\frac{a}{c}\right)^{\frac{y_j^d}{2}} L(y_j^d, \hat{y}_j^d), \quad [4]$$

where $\hat{y}_i^h = \text{sgn}(\alpha \cdot h_i)$ and $\hat{y}_j^d = \text{sgn}(\beta \cdot d_j)$.

Accordingly, the supervised model may be so built (Step 406). Then, the links may be incorporated into the model to derive hosts' and domains' label predictions at the same time (Step S407). In doing so, it may be assumed that if two nodes of the bipartite graph are connected, there is a higher probability that they share a common label (e.g. the probability may increase proportional to the edge weight of the link). Thus equation [4] may be modified by adding a regularization term to reflect this assumption. For example, Hamming distance may be used as a loss function in this regard. This yields:

$$\min_{\alpha,\beta} \frac{1}{l^h} \sum_{i=1}^{l^h} \left(\frac{a}{c}\right)^{\frac{y_i^h}{2}} |y_i^h - \hat{y}_i^h| + \quad [5]$$

$$\frac{1}{l^d} \sum_{j=1}^{l^d} \left(\frac{a}{c}\right)^{\frac{y_j^d}{2}} |y_j^d - \hat{y}_j^d| + \lambda \sum_{i=1}^{H} \sum_{j=1}^{D} M_{ij} |\hat{y}_i^h - \hat{y}_j^d|,$$

where $\hat{y}_i^h = \text{sgn}(\alpha \cdot h_i)$, $\hat{y}_j^d = \text{sgn}(\beta \cdot d_j)$, $\lambda$ is the regularization parameter.

As Hamming distance is non-differentiable, a continuous loss function may be used to approximate the Hamming distance. The closeness of this approximation may be established by theoretically presenting an upper bound of the distance between the Hamming distance and the continuous loss functions. Further, the CCLR algorithm and convergence analysis may be presented.

For this purpose, the following definition may be observed:

$$f(y_i^h, \hat{y}_i^h) = \frac{2}{m} \log(1 + \exp(-y_i^h(\alpha \cdot h_i)))$$

Accordingly, it may be seen that the loss is close to zero when $y_i^h = \text{sgn}(\alpha \cdot h_i)$ and the loss may be larger than zero otherwise. Accordingly, the following equation may be determined:

$$\min_{\alpha,\beta} \frac{1}{l^h} \sum_{i=1}^{l^h} \underbrace{\left(\frac{a}{c}\right)^{\frac{y_i^h}{2}} \frac{2}{m} \log(1 + \exp(-y_i^h(\alpha \cdot h_i)))}_{f_{\lambda,a,c}^{h,i}(\alpha,\beta)} + \quad [6]$$

$$\frac{1}{l^d} \sum_{j=1}^{l^d} \underbrace{\left(\frac{a}{c}\right)^{\frac{y_j^d}{2}} \frac{2}{n} \log(1 + \exp(-y_j^d(\beta \cdot d_j)))}_{f_{\lambda,a,c}^{d,i}(\alpha,\beta)} +$$

$$\lambda \sum_{i=1}^{H} \sum_{j=1}^{D} \underbrace{\frac{2M_{ij}}{mn} \log(1 + \exp(-(\alpha \cdot h_i)(\beta \cdot h_j)))}_{g^{i,j}(\alpha,\beta)}$$

The objective functions may be defined by equations [5] and [6] as $F_{\lambda,\alpha,c}(\alpha,\beta)$ and $\tilde{F}_{\lambda,\alpha,c}(\alpha,\beta)$ respectively. Therefore, in theory, the upper bound of the difference between $F_{\lambda,\alpha,c}(\alpha,\beta)$ and $\tilde{F}_{\lambda,\alpha,c}(\alpha,\beta)$ may be expressed as:

$$|F_{\lambda,a,c}(\alpha,\beta) - \tilde{F}_{\lambda,a,c}(\alpha,\beta)| \leq \sqrt{\frac{c}{a}} \frac{2}{m} e^{-m} + \sqrt{\frac{c}{a}} \frac{2}{n} e^{-n} + \lambda \frac{2}{mn} e^{-mn} \quad [7]$$

where m/n is the dimensionality of hosts'/domains' features.

The above proposition is based on the approximation error vanishing, given sufficient dimensions in the hosts' and domains' features. As the objective function is differentiable, the gradients of $\tilde{F}_{\lambda,\alpha,c}(\alpha,\beta)$ with respect to $\alpha$ and $\beta$ are easy to obtain:

$$\frac{\partial \tilde{F}_{\lambda,a,c}(\alpha,\beta)}{\partial \alpha} = \frac{1}{l^h} \sum_{i=1}^{l^h} \left(\frac{a}{c}\right)^{\frac{y_i^h}{2}} \frac{2}{m} \frac{-y_i^h h_i}{1 + \exp(y_i^h(\alpha \cdot h_i))} + \quad [8]$$

$$\lambda \sum_{i=1}^{H} \sum_{j=1}^{D} M_{ij} \frac{2}{mn} \frac{-(\beta \cdot d_j) \cdot h_i}{1 + \exp((\alpha \cdot h_i)(\beta \cdot d_j))};$$

$$\frac{\partial \tilde{F}_{\lambda,a,c}(\alpha,\beta)}{\partial \alpha} = \frac{1}{l^d} \sum_{j=1}^{l^d} \left(\frac{a}{c}\right)^{\frac{y_j^d}{2}} \frac{2}{n} \frac{-y_j^d d_j}{1 + \exp(y_j^d(\beta \cdot d_j))} +$$

$$\lambda \sum_{i=1}^{H} \sum_{j=1}^{D} M_{ij} \frac{2}{mn} \frac{-(\alpha \cdot h_i) \cdot d_j}{1 + \exp((\alpha \cdot h_i)(\beta \cdot d_j))}.$$

To obtain the parameter estimates, a Stochastic Gradient Descent (SGD) technique may be applied. The idea here may be to begin with some random guess of $\alpha^0$ and $\beta^0$ and then based on equation [8], one element of $\alpha$ and $\beta$ may be randomly updated until the convergence criterion is satisfied. An example of such an algorithm is summarized below:

Algorithm 1 CCLR via the SGD Technique

Input: $\{y_i^h\}_{i=1}^{I^h}, \{h_i\}_{i=1}^H, \{y_j^d\}_{j=1}^{I^d}, \{d_j\}_{j=1}^D, M \in \{0, 1\}^{H \times D}, \lambda,$ and $\{\eta_t\}_{t \geq 1}$.
1: Initialize $\alpha^0$ and $\beta^0$;
2: while convergence criterion is not satisfied do
3:    Randomly choose a pair (i, j) from [m] × [n];
4:    $\alpha^{t+1} \leftarrow \alpha^t, \beta^{t+1} \leftarrow \beta^t$;

5: 
$$\alpha^{t+1}(i) \leftarrow \alpha^t(i) - \eta_t \frac{\partial \tilde{F}_{\lambda,a,c}(\alpha^t, \beta^t)}{\partial \alpha^t}(i);$$

6:
$$\beta^{t+1}(j) \leftarrow \beta^t(j) - \eta_t \frac{\partial \tilde{F}_{\lambda,a,c}(\alpha^t, \beta^t)}{\partial \beta^t}(j);$$

7:    Normalize $\alpha^{t+1}$ and $\beta^{t+1}$;
8: end while
Output: $\hat{\alpha} = \alpha^T$ and $\hat{\beta} = \beta^T$ The convergence of this algorithm may be analyzed. As $$\frac{\partial \tilde{F}_{\lambda,a,c}}{\partial \alpha} == \frac{1}{I^h} \sum_i \frac{\partial f_{\lambda,a,c}^i}{\partial \alpha} + \lambda \sum_{ij} M_{ij} \frac{\partial g^{i,j}}{\partial \alpha},$$

it may be determined that:

$$\frac{\partial^2 f_{\lambda,a,c}^i}{\partial \alpha^2} = \left(\frac{a}{c}\right)^{\frac{y_i^h}{2}} \frac{2}{m} \frac{(y_i^h h_i)^T (y_i^h h_i) \exp(y_i^h (\alpha \cdot h_i))}{(1 + \exp(y_i^h (\alpha \cdot h_i)))^2} + \lambda \frac{2 M_{ij}}{mn} \frac{((\beta \cdot d_j)^2 (h_i)^T (h_i) \exp((\beta \cdot d_j)(\alpha \cdot h_i))}{(1 + \exp((\beta \cdot d_j)(\alpha \cdot h_i)))^2}. \quad [9]$$

Assuming the features are normalized (normalization may be conducted in the preprocessing step), $h_i^T \cdot h_i = 1$ yields that:

$$\left\| \frac{\partial f_{\lambda,a,c}^i}{\partial \alpha}\bigg|_\alpha - \frac{\partial f_{\lambda,a,c}^i}{\partial \alpha}\bigg|_{\alpha'} \right\| \leq \quad [10]$$

$$\left\| \frac{\partial^2 f_{\lambda,a,c}^i}{\partial \alpha^2} \right\| \|\alpha - \alpha'\| \leq \frac{2}{m}\left(\sqrt{\frac{a}{c}} + \frac{\lambda}{n}\right)\|\alpha - \alpha'\|.$$

This indicates that $$\frac{\partial f_{\lambda,a,c}^i}{\partial \alpha} \text{ is } \frac{2}{m}\left(\sqrt{\frac{a}{c}} + \frac{\lambda}{n}\right);$$

Lipschitz continuity (A function $f: X \rightarrow Y$ is called λ-Lipschitz continuity, if for all $x_1$ and $x_2$, in X, $d_Y(f(x_1), f(x_2)) \leq \lambda d_X(x_1, x_2)$ holds).

As $$\frac{\partial^2 f_{\lambda,a,c}^i}{\partial \alpha^2} > 0$$

implying that $$\frac{\partial^2 f_{\lambda,a,c}}{\partial \alpha^2} = \sum_i \frac{\partial^2 f_{\lambda,a,c}^i}{\partial \alpha^2} > 0,$$

$\tilde{F}_{\lambda,a,c}(\alpha, \beta)$ may be a strongly convex function. Accordingly, with a constant step size of $$\eta_t = \frac{1}{2nL},$$

where $$L = \frac{2}{m}\left(\sqrt{\frac{a}{c}} + \frac{\lambda}{n}\right),$$

the $\alpha^t$ and $\beta^t$ obtained at the t-th iteration of CCLR may satisfy:

$$\mathbb{E}[\|\alpha^t - \alpha^*\|^2] \leq \quad [11]$$

$$\left(1 - \frac{\mu}{16\left(\sqrt{\frac{a}{c}} + \frac{\lambda}{n}\right)}\right)^t \left[3\|\alpha_0 - \alpha^*\|^2 + \frac{9\sigma^2}{4\left(\frac{2}{m}\left(\sqrt{\frac{a}{c}} + \frac{\lambda}{n}\right)\right)^2}\right].$$

$$\mathbb{E}[\|\beta^t - \beta^*\|^2] \leq$$

$$\left(1 - \frac{\mu}{16\left(\sqrt{\frac{a}{c}} + \frac{\lambda}{m}\right)}\right)^t \left[3\|\beta_0 - \beta^*\|^2 + \frac{9\sigma^2}{4\left(\frac{2}{n}\left(\sqrt{\frac{a}{c}} + \frac{\lambda}{m}\right)\right)^2}\right].$$

The above proposition states that as the iteration step increases, the model parameters are closer to the true parameters α* and β*. This may ensure the performance of the CCLR described above.

Thus according to the above, the supervised models that were built in Step 406 are then used to label all unknown nodes of the bipartite graph (Step 407). It may then be determined whether one or more of the previously unknown nodes have been labeled as positive/malicious (Step 408). If this is the case (Yes, Step 408) then an alert may be generated (Step 409). The alert may be a signal to a network administrator, for example, in the form of an email, text message or the like, that an anomaly has been detected in a host or domain. The network administrator may thereafter investigate the anomaly and take remedial action, as necessary.

However, according to some exemplary embodiments of the present invention, if it is determined that a confidence score associated with the positive label is of a sufficient magnitude (e.g., a confidence score exceeds a predetermined threshold) (Yes, Step 410), then in addition to the generation of the alert at Step 409, the network apparatus 200 (e.g. router or firewall) may be directed to automatically block or discontinue packet transmission to and/or from the anomalous host/domain (Step 411). In this way, security of the greater computer network and/or other domains, may be enhanced.

Figure 5:
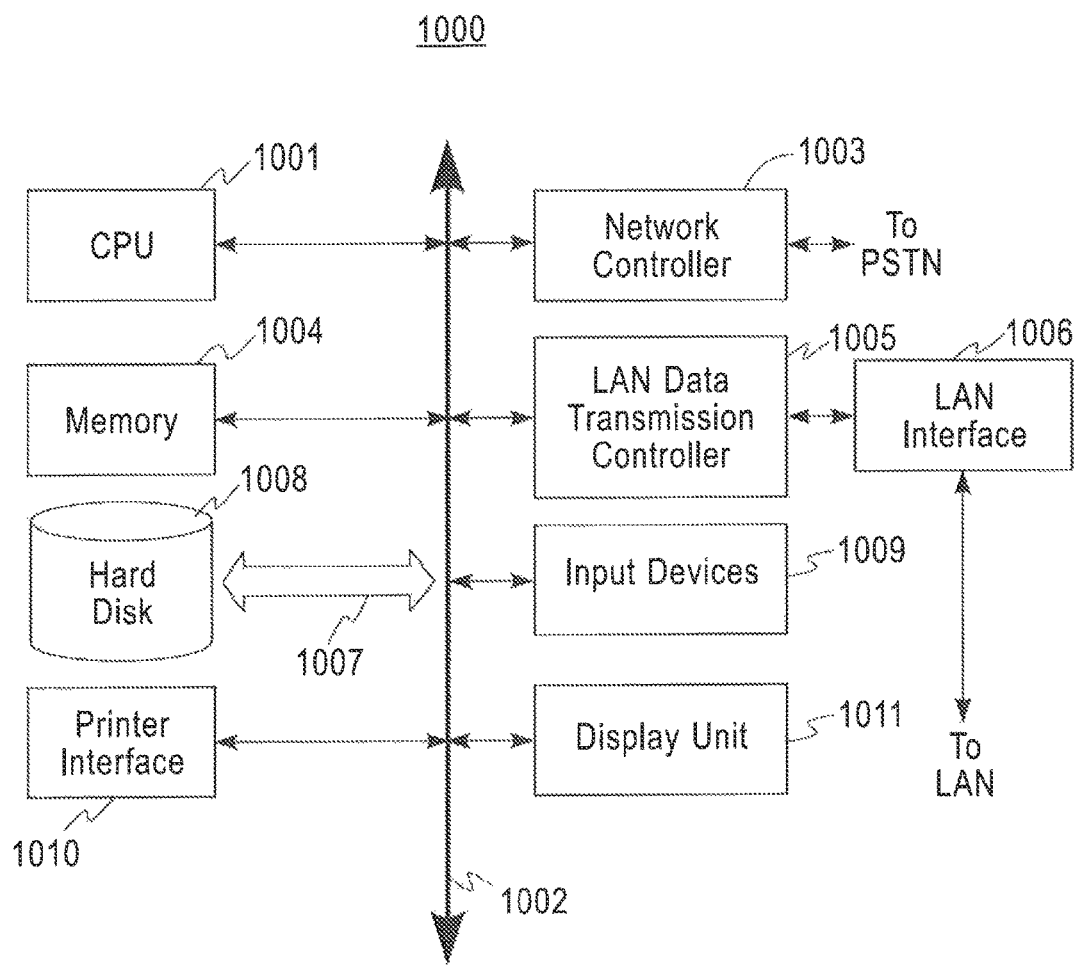
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A network security apparatus, comprising:
   a router or firewall disposed within a local computer network and configured to detect a transmission of data packets between a plurality of hosts within the local computer network and a plurality of domains outside of the local computer network and define a plurality of links therefrom, each of the plurality of links comprising an exchange of information between within the local computer network and outside of the local computer network;
   a model builder circuit receiving the plurality of links from the packet detector, receiving ground truth information labeling one or more of the plurality of hosts or one or more of the plurality of domains as benign or malicious, generating predictive models from the received links and ground truth information, and storing the generated predictive models in a predictive model database; and
   an anomaly detector circuit retrieving the generated predictive models from the predictive model database and using the predictive models to label each of the plurality of hosts and plurality of domains, that have not previously been labeled by the ground truth information, as benign or malicious,
   wherein the router or firewall is further configured to block traffic to and from each of the plurality of hosts within the local computer network and plurality of domains outside of the local computer network that have been labeled as malicious,
   wherein the predictive model is generated, by the model builder circuit, by constructing a bipartite graph in which each of the plurality of hosts within the local computer network are represented as nodes on one side of the graph, each of the plurality of domains outside of the local computer network are represented as nodes on an opposite side of the graph, and each of the plurality of links are represented as edges connecting nodes on opposite sides of the graph,
   wherein an edge weight of each of the edges is determined by either a number of packets transmitted between a given host and a given domain or an amount of data transferred between the given host and the given domain, and
   wherein, in the predictive model, a likelihood of propagating a label across a given edge, of each of the edges, is proportional to the edge weight of the given edge of each of the edges.

2. The network security apparatus of claim 1, wherein the router or firewall is a packet router device.

3. The network security apparatus of claim 1, wherein the router or firewall is a firewall device.

4. The network security apparatus of claim 1, wherein the edge weight of each of the edges is determined by the number of packets transmitted between the given host and the given domain.

5. The network security apparatus of claim 1, wherein the edge weight of each of the edges is determined by the amount of data transferred between the given host and the given domain.

6. The network security apparatus of claim 1, wherein the predictive model is generated, by the model builder circuit, by extracting features from each of the nodes of the graph and determining which of the extracted features are highly correlated to positive labels.

7. The network security apparatus of claim 6, wherein a node that is linked to a node with a positive label has an increased probability of being positively labeled.

8. A method for detecting malicious behavior in a computer network, comprising:
   receiving packet transmission information including a plurality of data links between a plurality of hosts and a plurality of domains;
   constructing a bipartite graph in which each of the plurality of hosts are represented as nodes on one side of the graph, each of the plurality of domains are represented as nodes on an opposite side of the graph, and each of the plurality of links are represented as edges connecting nodes on opposite sides of the graph;
   labeling one or more of the nodes of the bipartite graph as benign or malicious according to ground truth information;
   defining a cost matrix for misclassification penalty in which a misclassification penalty for labeling a benign node as malicious is less than a misclassification penalty for labeling a malicious node as benign;
   constructing supervised models or classifiers based on the nodes of the bipartite graph labeled according to ground truth information, the plurality of links, and the designed cost matrix;
   labeling each of the plurality of hosts and each of the plurality of domains, that have not previously been labeled by the ground truth information, as benign or malicious according to the constructed supervised models or classifiers; and
   blocking traffic to and from each of the plurality of hosts and plurality of domains that have been labeled as malicious,
   wherein an edge weight of each of the edges is determined by either a number of packets transmitted between a given host and a given domain or an amount of data transferred between the given host and the given domain, and
   wherein, in the supervised models or classifiers, a likelihood of propagating a label across a given edge, of each of the edges, is proportional to the edge weight of the given edge of each of the edges.

9. The method of claim 8, wherein at least a first of the constructed supervised models or classifiers is responsible for labeling nodes and at least a second of the constructed supervised models or classifiers is responsible for labeling domains.

10. The method of claim 8, wherein the supervised models or classifiers are constructed by extracting features from each of the nodes of the graph and determining which of the extracted features are highly correlated to malicious labels.

11. The method of claim 8, wherein when one of the plurality of hosts or plurality of domains, that have not previously been labeled by the ground truth information, is labeled as malicious, according to the constructed supervised models or classifiers, an alert is transmitted to a network administrator.

12. A method for detecting malicious behavior in a computer network, comprising:
- receiving packet transmission information including a plurality of data links between a plurality of hosts and a plurality of domains;
- constructing a bipartite graph in which each of the plurality of hosts are represented as nodes on one side of the graph, each of the plurality of domains are represented as nodes on an opposite side of the graph, and each of the plurality of links are represented as edges connecting nodes on opposite sides of the graph;
- labeling one or more of the nodes of the bipartite graph as benign or malicious according to ground truth information;
- propagating the labeling of the one or more nodes of the bipartite graph that have been labeled as benign or malicious along the plurality of links; and
- blocking traffic to and from each of the plurality nodes of the bipartite graph that have labeled as malicious along each of the plurality of links,
- wherein propagating the labeling of the one or more nodes of the bipartite graph. that have been labeled as benign or malicious along the plurality of links includes constructing supervised models or classifiers based on the nodes of the bipartite graph labeled according to ground truth information and the plurality of links, wherein a node that is linked to a node with a positive label has an increased probability of being positively labeled,
- wherein constructing supervised models or classifiers further includes designing a cost matrix for misclassification penalty in which a misclassification penalty for labeling a benign node as malicious is less than a misclassification penalty for labeling a malicious node as benign,
- wherein an edge weight of each of the edges is determined by either a number of packets transmitted between a given host and a given domain or an amount of data transferred between the given host and the given domain, and
- wherein, in the supervised models or classifiers, a likelihood of propagating a label across a given edge, of each of the edges, is proportional to the edge weight of the given edge of each of the edges.

13. The method of claim 12, wherein the supervised models or classifiers are constructed by extracting features from each of the nodes of the graph and determining which of the extracted features are highly correlated to malicious labels.

14. The method of claim 12, wherein when a malicious label is propagated, an alert is generated.

* * * * *